United States Patent
Joshi et al.

(10) Patent No.: US 11,594,364 B2
(45) Date of Patent: Feb. 28, 2023

(54) SYSTEMS AND METHODS FOR THERMAL MANAGEMENT IN INDUCTORS

(71) Applicant: Hamilton Sundstrand Corporation, Charlotte, NC (US)

(72) Inventors: Ashutosh Joshi, Roscoe, IL (US); Debabrata Pal, Hoffman Estates, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 203 days.

(21) Appl. No.: 16/823,062

(22) Filed: Mar. 18, 2020

(65) Prior Publication Data

US 2021/0296045 A1 Sep. 23, 2021

(51) Int. Cl.
*H01F 27/10* (2006.01)
*H01F 27/28* (2006.01)
(Continued)

(52) U.S. Cl.
CPC ....... *H01F 27/2876* (2013.01); *H01F 17/062* (2013.01); *H01F 27/02* (2013.01);
(Continued)

(58) Field of Classification Search
CPC .... H01F 27/2876; H01F 17/062; H01F 27/02; H01F 27/085; H01F 27/10; H01F 27/2895; H01F 27/025
See application file for complete search history.

(56) References Cited

U.S. PATENT DOCUMENTS

| 1,790,906 A * | 2/1931 | Eckman | ................ | H01F 27/025 336/62 |
| 2,825,033 A * | 2/1958 | Rudd | ....................... | H05B 6/36 336/62 |

(Continued)

FOREIGN PATENT DOCUMENTS

| EP | 2528073 A1 | 11/2012 |
| EP | 2568484 A1 | 3/2013 |

(Continued)

OTHER PUBLICATIONS

Extended European Search Report dated Aug. 11, 2021, issued during the prosecution of European Patent Application No. EP 21163455.5 (9 pages).

*Primary Examiner* — Tuyen T Nguyen
(74) *Attorney, Agent, or Firm* — Locke Lord LLP; Scott D. Wofsy; Alicia J. Carroll

(57) ABSTRACT

A thermal management includes an inductor, a housing in thermal communication with the inductor, the housing defining a wall, and a conductor. The conductor has a greater heat transfer rate than the wall and is positioned within a groove and/or an aperture formed in the wall. The conductor is configured to transfer heat through the wall more efficiently than if the conductor were not present. A method of manufacturing a thermal management system includes forming a housing by additive manufacturing. The housing defines a wall having at least one of a groove and an aperture defined therein. The method includes positioning a conductor in at least one of the groove and the aperture. The conductor has a greater heat transfer rate than the wall. The method includes positioning an inductor into thermal communication with the housing.

13 Claims, 4 Drawing Sheets

(51) Int. Cl.
*H01F 17/06* (2006.01)
*H01F 27/02* (2006.01)
*H01F 27/08* (2006.01)

(52) U.S. Cl.
CPC .......... *H01F 27/085* (2013.01); *H01F 27/10* (2013.01); *H01F 27/2895* (2013.01)

(56) References Cited

U.S. PATENT DOCUMENTS

| | | | | |
|---|---|---|---|---|
| 2,872,651 | A * | 2/1959 | Treanor | .......... H01F 27/12 |
| | | | | 174/15.1 |
| 7,002,443 | B2 * | 2/2006 | Ness | .......... H01F 27/266 |
| | | | | 336/60 |
| 9,373,436 | B2 | 6/2016 | Pal | |
| 9,559,508 | B2 | 1/2017 | Shepard et al. | |
| 10,015,908 | B2 | 7/2018 | Williams et al. | |
| 2018/0096785 | A1 | 4/2018 | Hull et al. | |

FOREIGN PATENT DOCUMENTS

| | | | | |
|---|---|---|---|---|
| EP | 2966659 | A2 | 1/2016 | |
| JP | 59150410 | A * | 8/1984 | ............ H01F 27/18 |
| WO | 2005001853 | A2 | 1/2005 | |

* cited by examiner

SYSTEMS AND METHODS FOR THERMAL MANAGEMENT IN INDUCTORS

BACKGROUND

1. Field

The present disclosure relates to inductors, and more particularly to thermal management in inductor assemblies.

2. Description of Related Art

Inductors are important components in power electronics circuits. A variety of systems are used to create efficient thermal management in order to meet inductance requirements. The inductor generally includes a core and a wire winding wrapped or coiled around the core. The inductor is generally positioned within a metal housing. The wire winding needs to be spaced apart from the metal housing, the space between the winding and the metal housing is typically filled with potting material. The core material, potting material, and wire insulations for the windings generally have temperature limits. These temperature limits and other thermal requirements require efficient heat transfer from the heat-generating components (the core and wire winding), and/or a coolant used (which can sometimes be at high temperature, e.g. 70-90° C.), to a heat sink (e.g. a cold plate). Generally, heat is transferred to the heat sink using the potting material which generates large gradient between the heat generating components and heat sink due to lower thermal conductivity of the potting material.

The conventional techniques have been considered satisfactory for their intended purpose. However, there is an ever present need for improved systems and methods for thermal management in inductors. This disclosure provides a solution for this need.

SUMMARY

A thermal management includes an inductor, a housing in thermal communication with the inductor, the housing defining a wall, and a conductor. The conductor has a greater heat transfer rate than the wall and is positioned within a groove and/or an aperture formed in the wall. The conductor is configured to transfer heat through the wall more efficiently than if the conductor were not present.

The conductor can be a heat pipe. The wall of the housing can include an outer wall and an inner wall. At least one of the outer wall or the inner wall can define an inner surface. The inductor can include a toroidal core and a winding coiled around the toroidal core. The housing can include at least one of a tin or nickel plating.

In certain embodiments, the inner surface includes the groove defined therein. The groove can be helical relative to a central axis of the housing. The conductor can be soldered within the groove to the inner surface of the housing. The conductor can be one of a plurality of conductors. Each of the plurality of conductors can be positioned in end-to-end abutment within the groove.

In certain embodiments, at least one of the outer wall or the inner wall includes the aperture, wherein the aperture is an axially extending aperture. The conductor can be positioned within the axially extending aperture. A longitudinal axis of the conductor can be aligned with a longitudinal axis of the axially extending aperture. The axially extending aperture can be aligned with a central axis of the housing. The axially extending aperture can be one of a plurality of axially extending apertures defined about a circumference of the outer wall. The conductor can be one of a plurality of conductors. Each of the plurality of conductors can be positioned within a respective one of the axially extending apertures. The axially extending apertures can be equally spaced apart around the circumference of the outer wall.

In accordance with another aspect, a method of manufacturing a thermal management system includes forming a housing by additive manufacturing. The housing defines a wall having at least one of a groove and an aperture defined therein. The method includes positioning a conductor in at least one of the groove and the aperture. The conductor has a greater heat transfer rate than the wall. The method includes positioning an inductor into thermal communication with the housing.

Forming the housing can include forming the wall having an outer wall and an inner wall. At least one of the outer wall or the inner wall can define an inner surface.

In certain embodiments, forming the housing includes forming the groove within the inner surface. Forming the groove can include forming the groove with a helical shape relative to a central axis of the housing. In certain embodiments, forming the housing includes forming the aperture in at least one of the outer wall or the inner wall, wherein the aperture is an axially extending aperture. Forming the axially extending aperture can include forming a plurality of axially extending apertures about a circumference of the outer wall. The axially extending apertures can be equally spaced apart around the circumference of the outer wall. The method can include coiling a winding around the inductor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
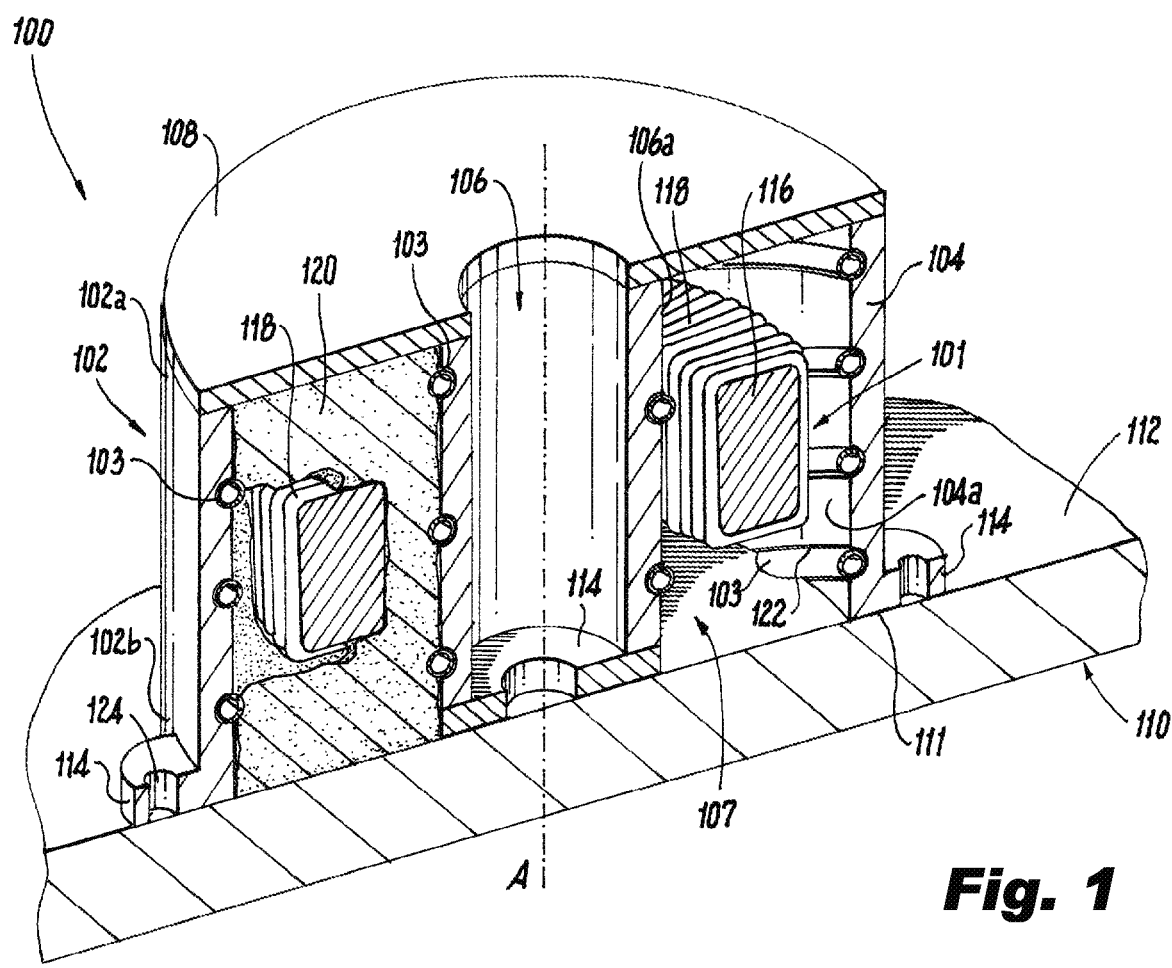
FIG. 1 is a schematic cross-sectional perspective view of an embodiment of a thermal management system constructed in accordance with the present disclosure, showing a toroidal housing around a toroidal inductor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are shown in FIGS. 1A-4 and described below. The systems and methods described herein provide for a thermal management system for an inductor assembly with improved thermal distribution across the inductor housing.

As shown in FIG. 1, a thermal management system 100 includes a toroidal inductor 101, a toroidal housing 102 around the toroidal inductor 101. The toroidal housing 102 is defined by an outer wall 104 and an inner wall 106. The housing 102 includes a top wall or lid 108. The toroidal inductor 101 includes a toroidal core 116 and winding 118 coiled around the toroidal core 116. The toroidal housing and/or inductor core can have a rectangular toroid shape, circular toroid shape, or the like. It is also contemplated that the inner and outer housing walls and/or inner and outer surfaces of the inductor can be annular, or generally concentric with one another and have a variety of other shapes, e.g. squares, ovals or the like. The winding 118 and core 116 generally generate a large amount of heat. Winding 118 can be made from a single wire 118 coiled about core 116, or a plurality of wire windings. Those skilled in the art will readily appreciate that the wire 118 could be a solid wire or a strand of wire in the form of a Litz wire. A potting material 120 surrounds toroidal inductor 101 and is positioned between the toroidal inductor 101 and the toroidal housing 102. Potting material 120 is within an interior 107 of toroidal housing 102 between the toroidal inductor 101 and inner and outer walls 106 and 104, respectively, of the toroidal housing 102. For clarity purposes, potting material 120 is depicted as partially removed from the left side of housing 102 in FIG. 1 and entirely removed from the right side of housing 102, as oriented in FIG. 1. In actuality, potting material 120 would generally fill the entire interior 107 of housing 102. The heat is transferred through potting material 120 (i) to the housing 102 and then to a cold plate 110, or (ii) directly to the cold plate 110. Due to the heat transfer properties of the potting material 120 (in particular, thermal conductivity), there is generally a large temperature gradient between the heat generating source (the inductor 101) and cold plate 110.

Figure 2:
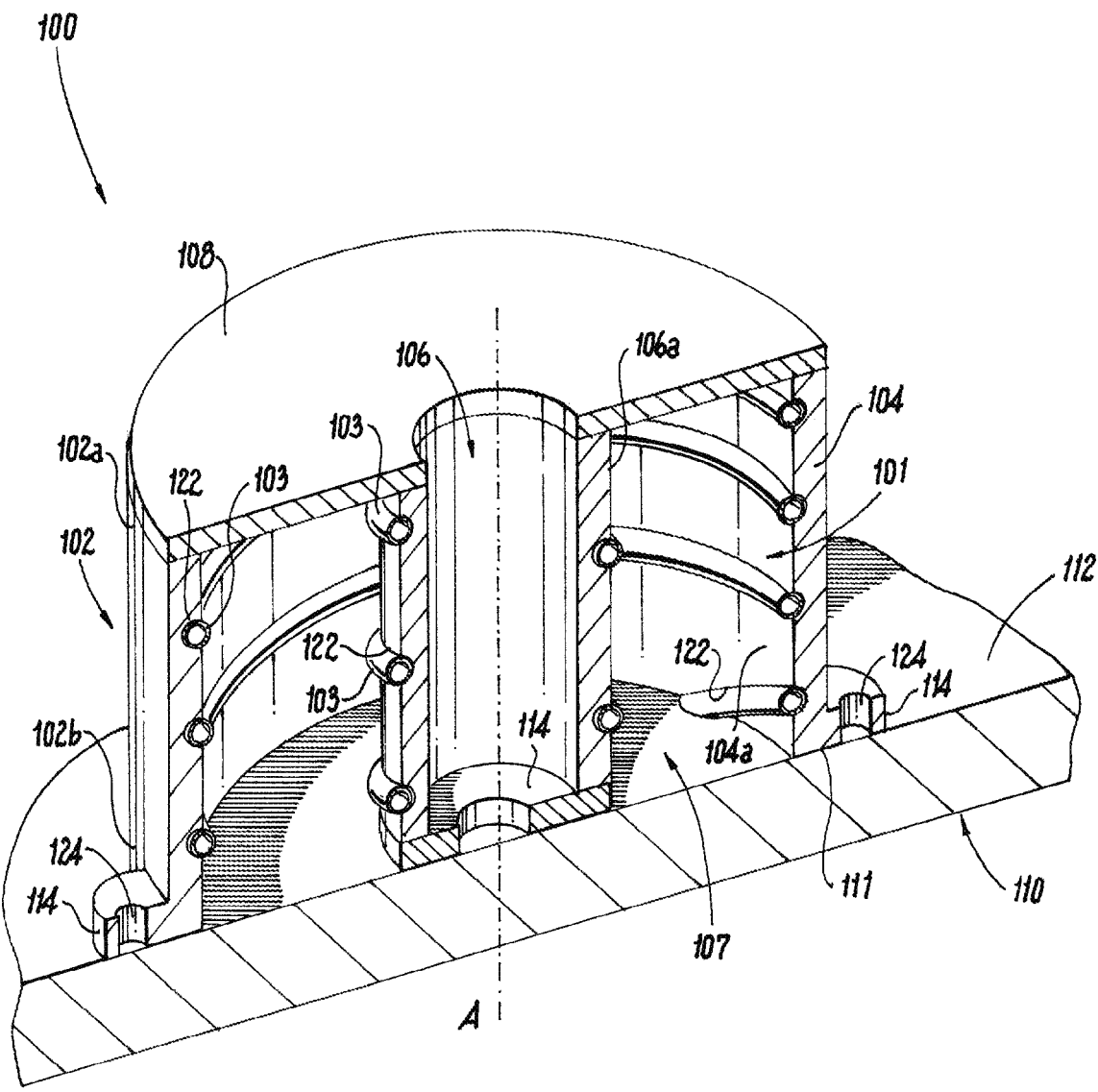
FIG. 2 is a schematic cross-sectional perspective view of the thermal management system of FIG. 1, with the inductor removed to show the helical grooves defined in inner-facing surfaces of the inner and outer walls of the toroidal housing.

As shown in FIGS. 1-2, system 100 includes conductors 103, e.g. heat pipes 103. The heat pipes 103 (in combination with the heat transfer fluid therein) have greater heat transfer rate than the inner and outer walls 106 and 104. The heat pipes 103 are configured to conduct heat through inner and outer walls 106 and 104 from one side, e.g. first side 102a, of the housing 102 to the other, e.g. second side 102b, more efficiently than if the conductor were not present. Each heat pipe 103 is positioned in abutment with the toroidal housing 102 to conduct heat from first side 102a of the toroidal housing 102, e.g. a side proximate to inductor 101, to second side 102b of the toroidal housing 102, e.g. the side proximate to the cold plate 110. Heat pipes 103 are enclosed metal tubes with fluid contained therein. The fluid is not depicted in FIGS. 1-2, but is shown schematically in FIGS. 3-4 within a heat pipe 203, for example. The fluid is generally a two-phase heat transfer fluid where the heated vapor flows from the hotter region to the cooler side through the channel defined within heat pipe 103 and condensed liquid-return via wicking action. This process enhances conduction top to bottom in housing 102. Heat pipes can also be oscillating heat pipes that use two-phase fluid flow to transfer heat between toroidal inductor 101 and cold plate 110.

With continued reference to FIGS. 1-2, heat pipes 103 are used on the sides of the housing 102 (e.g. inner and outer walls 106 and 104) to reduce gradient from a top side, e.g. a first side 102a, to a bottom side, e.g. a second side 102b. The outer wall 104 and the inner wall 106 each define respective inner surfaces 104a and 106a, respectively, that face the interior of the housing 102 and the toroidal inductor 101. The inner surfaces 104a and 106a of both outer and inner walls 104 and 106 each include a groove 122 defined therein. Each groove 122 is helical relative to a central axis A of the toroidal housing 102. Each heat pipe 103 is soldered within a respective groove 122 to a respective one of the inner surfaces 104a and 106a. The toroidal housing 102 includes at least one of a tin or nickel plating locally or globally as desired to assist with soldering the heat pipes 103 or other conductor, e.g. a copper spreader, into grooves 122.

Figure 1A:
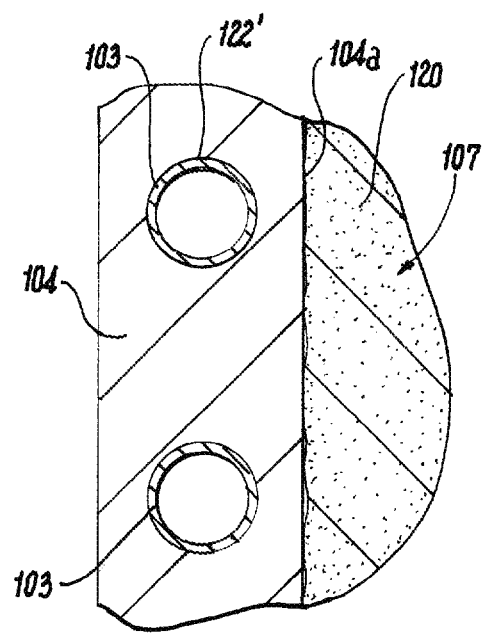
FIG. 1A is a schematic cross-sectional view of a portion of another embodiment of a thermal management system constructed in accordance with the present disclosure, showing a helical aperture defined within an outer wall of a toroidal housing of the system.

In some embodiments, as shown in FIG. 1A, instead of having grooves 122 at least partially open to the interior 107 of housing 102, heat pipes 103 are enclosed within helical apertures 122'. Helical apertures 122' are bounded by outer wall 104, such that the helical apertures 122' are isolated from the potting material 120 that fills the interior 107 of housing 102. Similar helical apertures 122' can be included in inner wall 106.

With continued reference to FIGS. 1-2, groove 122 is generally longer than the length of a given one of the heat pipes 103. As such, a plurality of heat pipes 103 are used within a given groove 122. The heat pipes 103 are positioned within the groove 122 in end-to-end abutment with one another. The second side 102b of the toroidal housing 102 is proximate to and abuts a cold plate 110. Bottom surface 111 of toroidal housing 102 abuts a top surface 112 of cold plate 110. The toroidal housing 102 is mounted to cold plate 110 by way of mounting flanges 114 of housing 102. The mounting flanges 114 include apertures 124 and are fixed to cold plate 110 by way of fasteners such as screws, bolts and the like. Additionally, inner surfaces 104a and 106a can each include multiple separate helical grooves defined therein.

Figure 3:
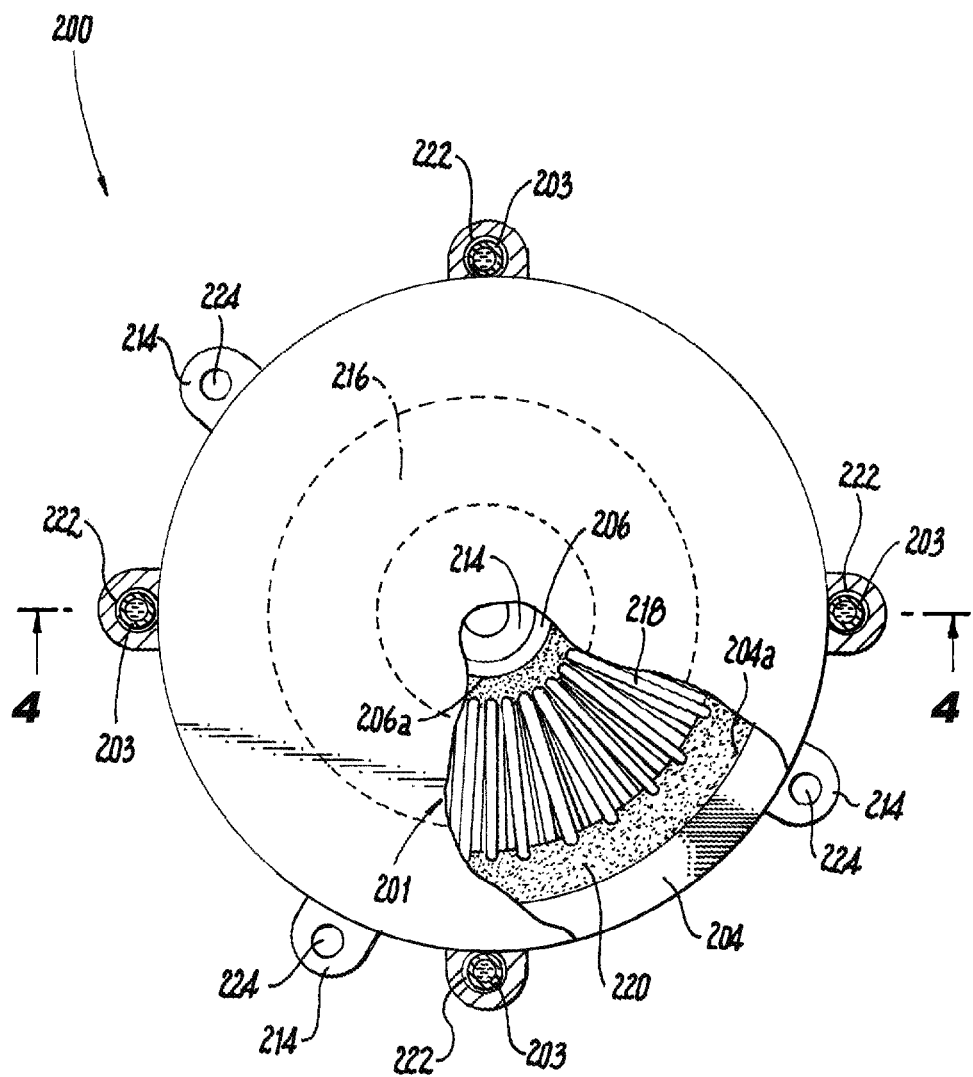
FIG. 3 is a schematic top plan view of another embodiment of a thermal management system constructed in accordance with the present disclosure, showing a toroidal housing around a toroidal inductor, where portions of the toroidal housing are shown in cross-section and where portions broken away to show the interior of the housing.
Figure 4:
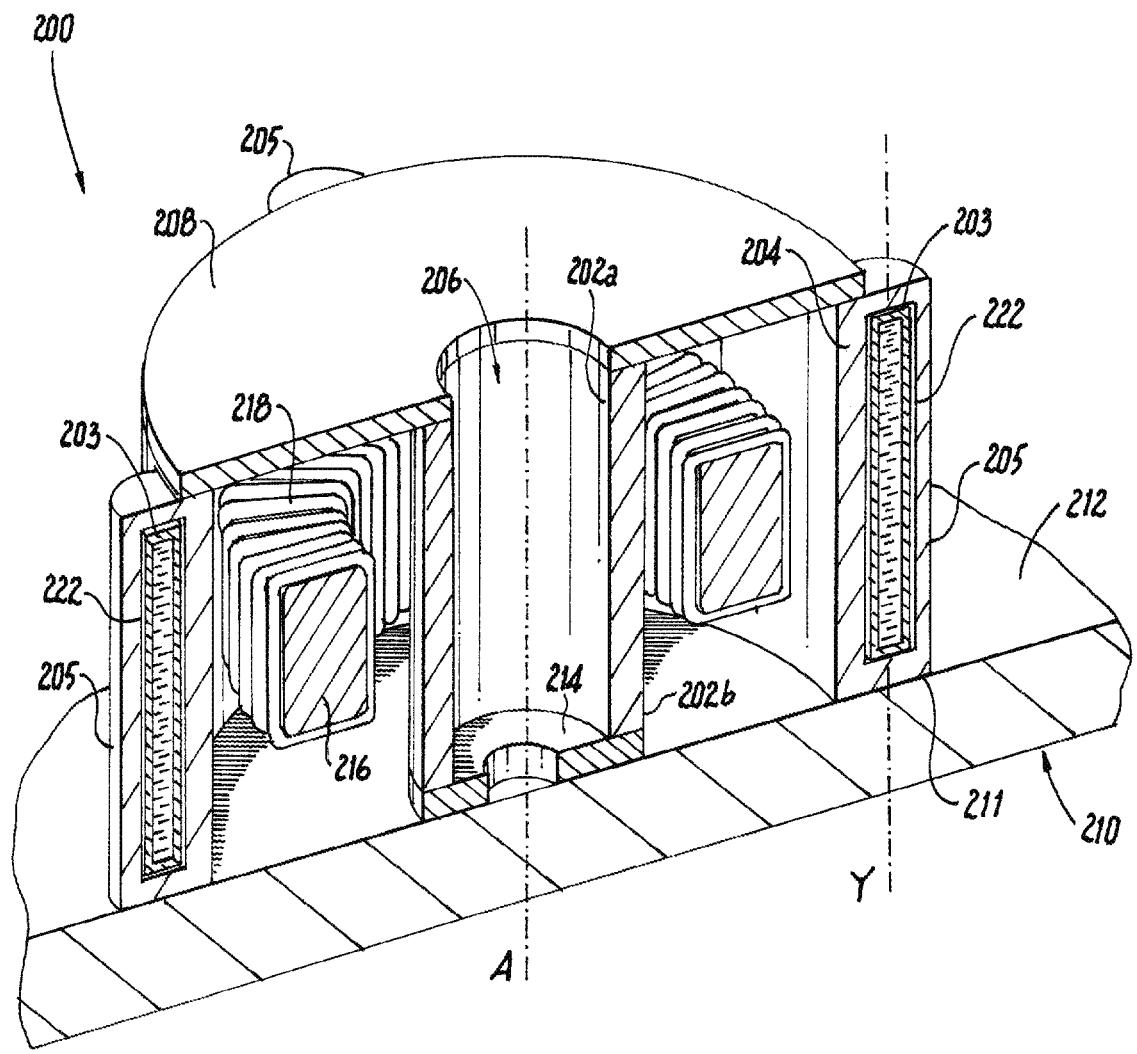
FIG. 4 is a schematic cross-sectional perspective view of the thermal management system of FIG. 3, showing the vertically extending apertures defined in the outer wall of the toroidal housing.

As shown in FIGS. 3-4, a thermal management system 200 is the same as thermal management system 100 as described above, except that instead of having helical grooves 122 defined in the outer and/or inner walls, a toroidal housing 202 is defined by an outer wall 204 and an inner wall 206, where the outer wall 204 defines axially extending apertures 222. The housing 202 includes a top wall or lid 208. The outer wall 204 and the inner wall 206 each define respective inner surfaces 204a and 206, respectively, that face the interior of the housing 202. The axially extending apertures 222 are defined within a flange portion 205 of outer wall 204. Conductors, e.g. heat pipes 203, are positioned within the axially extending apertures 222 and are in abutment with the toroidal housing 202 to conduct heat from a first side 202a of the toroidal housing to a second side 202b of the toroidal housing 202. The portion of outer wall 204 with apertures 222 and the heat pipes 203 therein, are shown partly in cross-section. The conductors, e.g. heat pipes 203, operate in the same manner as heat pipes 103, described above.

As shown in FIGS. 3-4, a thermal management system 200 includes a toroidal inductor 201 and toroidal housing 202 around the toroidal inductor 201. Top wall 208 is shown partially broken away in FIG. 3 to show toroidal inductor 201. The toroidal inductor 201 includes a toroidal core 216 and winding 218 coiled around the toroidal core 216. The winding 218 and core 216 are the same as winding 118 and core 116 described above. A potting material 220 surrounds toroidal inductor 201 and is positioned between the toroidal inductor 201 and the inner and outer walls 206 and 204, respectively, of toroidal housing 202. Potting material 220 is the same as potting material 120. For clarity purposes, potting material 220 is not shown in FIG. 4.

With continued reference to FIGS. 3-4, a longitudinal axis Y of each conductor 203 is aligned with a longitudinal axis of its respective axially extending aperture 222 (the longitudinal axis of the aperture 222 is also shown by longitudinal axis Y. Each axially extending aperture 222 is aligned with (e.g. substantially parallel to) a central axis A of the toroidal housing 202. The axially extending apertures 222 are defined about a circumference of the outer wall 204. The axially extending apertures 222 are equally spaced apart around the outer circumference of the outer wall 204. For example, as shown in FIG. 3, they can be positioned at 12, 3, 6 and 9 o'clock positions. The toroidal housing 202 is mounted to cold plate 210 by way of mounting flanges 214 of housing 202. Bottom surface 211 of toroidal housing 202 abuts a top surface 212 of cold plate 210. The mounting flanges 214 include apertures 224 and are fixed to cold plate 210 by way of fasteners such as screws, bolts and the like. Mounting flanges 214 can be interspersed between apertures 222 around the circumference of the outer wall 204. It is also contemplated that inner wall 206 can also include longitudinally extending apertures 222 defined therein.

It is contemplated that grooves 122 of housing 102 and the apertures 222 of housing 202 can be combined into a single thermal management system. In other words, one could readily include helical grooves like grooves 122 on an inner surface 206a of inner wall 206 and/or on an inner surface 204a of an outer wall 204. Heat pipes like heat pipes 103 could be included within the grooves.

A method of manufacturing a thermal management system, e.g. system 100 or 200, includes forming a toroidal housing, e.g. a toroidal housing 102 or 202, by three-dimensional printing, which allows for the complex groove and/or aperture geometries described above. Forming the toroidal housing includes forming an outer wall, e.g. an outer wall 104 or 204, and an inner wall, e.g. inner wall 106 or 206, wherein at least one of the outer wall or the inner wall defines an inner surface, e.g. inner surfaces 102a and/or 104a, and 202a and/or 204a.

In some embodiments, forming the toroidal housing includes forming a groove, e.g. groove 122, within the inner surface. Forming the groove includes forming the groove with a helical shape relative to a central axis, e.g. central axis A, of the toroidal housing. In some embodiments, forming the toroidal housing includes forming an axially extending aperture, e.g. aperture 222, in at least one of the outer wall or the inner wall. Forming the axially extending aperture includes forming a plurality of axially extending apertures about a circumference of the outer wall, wherein the axially extending apertures are equally spaced apart around the circumference of the outer wall. The method includes positioning a conductor, e.g. heat pipes 103 or 203, in the at least one of the groove or the aperture to conduct heat from a first side, e.g. first side 102a or 202a, of the toroidal housing to a second side, e.g. 102b or 202b, of the toroidal housing. The method includes coiling a winding, e.g. winding 118 or 218, around the inductor. The method includes positioning an inductor, e.g. an inductor 101, within the toroidal housing and securing it within the housing with potting material, e.g. potting material 120 or 220.

The methods and systems of the present disclosure, as described above and shown in the drawings, provide for thermal management systems and methods of forming that redistribute heat by way of conduction across a housing body. The thermal management systems and methods of forming described herein provide for improved heat conduction away from inductors toward cold plate by using heat-pipe or other high conductivity conductors embedded (at least partially or fully) within the housing walls. This results in improved reliability due to the reduced inductor temperatures thus alleviating the thermal gradient. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An inductor assembly having a thermal management system, the inductor assembly comprising:
   an inductor;
   a housing in thermal communication with the inductor, the housing defining a wall; and
   a conductor having a greater heat transfer rate than the a material of the wall positioned within a groove formed in the wall, wherein the wall of the housing includes an outer wall and an inner wall, wherein at least one of the outer wall or the inner wall defines an inner surface facing toward the inductor, wherein the inner surface includes the groove defined therein.

2. The assembly as recited in claim 1, wherein the groove is helical relative to a central axis of the housing.

3. The assembly as recited in claim 2, wherein the conductor is soldered within the groove to the inner surface of the housing.

4. The assembly as recited in claim 1, wherein the conductor is one of a plurality of conductors, wherein each of the plurality of conductors are positioned in end-to-end abutment within the groove.

5. The assembly as recited in claim 1, wherein at least one of the outer wall or the inner wall includes an aperture, wherein the aperture is an axially extending aperture.

6. The assembly as recited in claim 5, wherein a second conductor is positioned within the axially extending aperture, wherein a longitudinal axis of the second conductor is aligned with a longitudinal axis of the axially extending aperture.

7. The assembly as recited in claim 5, wherein the axially extending aperture is aligned with a central axis of the housing.

8. The assembly as recited in claim 5, wherein the second conductor is a heat pipe.

9. The assembly as recited in claim 5, wherein the axially extending aperture is one of a plurality of axially extending apertures defined about a circumference of the outer wall.

10. The assembly as recited in claim 9, wherein the second conductor is one of a plurality of second conductors, wherein each of the plurality of second conductors is positioned within a respective one of the axially extending apertures.

11. The assembly as recited in claim 9, wherein the axially extending apertures are equally spaced apart around the circumference of the outer wall.

12. The assembly as recited in claim 1, wherein the inductor includes a toroidal core and a winding coiled around the toroidal core.

13. The assembly as recited in claim 1, wherein the housing includes at least one of a tin or nickel plating.

* * * * *